(12) United States Patent
Frederiksen et al.

(10) Patent No.: US 11,592,525 B2
(45) Date of Patent: Feb. 28, 2023

(54) FILTER DEVICE FOR AN OPTICAL SENSOR

(71) Applicant: Robert Bosch GmbH, Stuttgart (DE)

(72) Inventors: Annette Frederiksen, Renningen (DE); Simone Hoeckh, Renningen (DE); Stefanie Hartmann, Rottenburg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 635 days.

(21) Appl. No.: 16/611,416

(22) PCT Filed: May 28, 2018

(86) PCT No.: PCT/EP2018/063881
§ 371 (c)(1),
(2) Date: Nov. 6, 2019

(87) PCT Pub. No.: WO2018/228807
PCT Pub. Date: Dec. 20, 2018

(65) Prior Publication Data
US 2020/0174099 A1  Jun. 4, 2020

(30) Foreign Application Priority Data

Jun. 16, 2017 (DE) .......................... 102017210101.6

(51) Int. Cl.
| | |
|---|---|
| *G02B 5/32* | (2006.01) |
| *G02B 5/20* | (2006.01) |
| *G03H 1/02* | (2006.01) |
| *G01S 7/481* | (2006.01) |
| *G01S 7/4865* | (2020.01) |

(52) U.S. Cl.
CPC ............ *G01S 7/481* (2013.01); *G01S 7/4865* (2013.01); *G02B 5/203* (2013.01); *G02B 5/32* (2013.01); *G03H 1/0248* (2013.01)

(58) Field of Classification Search
CPC .. G03H 1/0248; G03H 1/0244; G03H 1/0252; G03H 2250/00; G03H 2250/12; G03H 2250/34; G03H 2250/33; G03H 2250/32; G03H 2001/2615; G03H 1/28;
(Continued)

(56) References Cited

U.S. PATENT DOCUMENTS

| | | | |
|---|---|---|---|
| 2016/0370625 A1* | 12/2016 | Fontecchio | G03H 1/04 |
| 2019/0219676 A1* | 7/2019 | Frederiksen | G02B 5/32 |

FOREIGN PATENT DOCUMENTS

| | | | | |
|---|---|---|---|---|
| DE | 102013221506 A1 * | 4/2015 | ............. | G01S 17/08 |
| DE | 102013221506 A1 | 4/2015 | | |

(Continued)

OTHER PUBLICATIONS

International Search Report for PCT/EP2018/063881, dated Aug. 17, 2018.

*Primary Examiner* — Jade R Chwasz
(74) *Attorney, Agent, or Firm* — Norton Rose Fulbright US LLP; Gerard Messina

(57) ABSTRACT

A filter device for an optical sensor, including a hologram having a defined number of holographic functions, which are developed in such a way that the filter device blocks optical radiation that impinges upon the filter device from a defined first solid angle and optical radiation that impinges upon the filter device from a defined second solid angle is able to pass through the filter device.

12 Claims, 7 Drawing Sheets

(58) Field of Classification Search
CPC ...... G01S 7/481; G01S 7/4865; G01S 7/4816; G01S 17/931; G02B 5/203; G02B 5/32
USPC .......................................................... 359/15
See application file for complete search history.

(56) References Cited

FOREIGN PATENT DOCUMENTS

| | | |
|---|---|---|
| EP | 1006375 A1 | 6/2000 |
| WO | 02101428 A1 | 12/2002 |
| WO | 2018137950 A1 | 8/2018 |

\* cited by examiner

FILTER DEVICE FOR AN OPTICAL SENSOR

FIELD

The present invention relates to a filter device for an optical sensor. In addition, the present invention relates to a method for producing a filter device for an optical sensor.

BACKGROUND INFORMATION

In the motor vehicle or tool field, conventional lidar sensors in the form of what is called TOF (time of flight) sensors guide transmitted light via a deflection mirror or a transmission optics into the environment and detect reflected radiation in the process.

Lidar sensors are becoming increasingly more important in the context of autonomous and highly automated driving. In addition to radar and video sensors, they offer a further possibility for detecting the environment. They are based on a different measuring principle and thus contribute to the reliability of the measured data points in a sensor data fusion. In most cases, lidar sensors have a field of view that has different extensions in the horizontal and vertical directions. A field of view that horizontally covers a defined angle and is vertically able to detect a defined angle (without calibration tolerances) is required for a functionality of an autonomously driving vehicle. Exemplary values for the mentioned angles are: horizontally approximately 50° and vertically approximately 9°.

Quite different system concepts are used in the mentioned lidar sensors (e.g., micro mirrors, macro mirrors, scanning, rotating, etc.). Some of these concepts use a lens system on the receiving side which collects the light backscattered by the objects and images it onto a detector. If the receiving optics is not moving as well, then such a lens system must image the entire field of view (including calibration tolerances) onto the detector, so that the demands on the field of view may be greater.

In contrast to conventional optics, in the case of holographic optical elements which are realized as volume holograms, the beam deflection is not defined by a refraction but by a diffraction at the volume grating. The holographic optical elements are able to be produced both in transmission and in reflection, and because of the free selection of the angle of incidence and the reflection or diffraction angles, they allow for new designs. The holographic diffraction grating is exposed in a layer of light-sensitive material (e.g., photopolymer, silver halide, etc.). This layer is applied to a substrate (e.g., foil, glass, etc.) which is adapted to the diffraction index. Liquid holographic materials, which have advantages in an application on curved surfaces, for instance, are also conceivable.

Because of the volume diffraction, a characteristic wavelength and angle selectivity or also a filter function may additionally be allocated to the holographic optical elements. Depending on the recording condition (wavelength, angle), only light from defined directions and of defined wavelengths is diffracted at the structure. FIG. 1 illustrates the dependence of the wavelength selectivity in holographic optical elements on the orientation of the holographic grating or also of the alignment and the periodicity of the diffraction grating on the recording condition. A tilting angle of a holographic grating can be seen plotted on the x-axis and a clearance of the interference planes of the holographic gratings plotted in nanometers on the y-axis. The scaling in FIG. 1 represents the spectral selectivity (optically active range) of the gratings. Depending on the grating type (tilting angle and clearance of the interference planes), only a defined wavelength range is diffracted at the structure. This range represents the 20 nm-180 nm scaling in FIG. 1.

The angle and wavelength selectivity of the volume holograms is illustrated in FIGS. 2 and 3 for a defined geometry and defined material properties. A width of the range in which the wavelength of the light utilized for the playback of the hologram may range and the size of the angular range under which the light beam utilized for this purpose may be incident relative to the alignment of the grating planes in order for the diffraction to take place as desired with sufficient efficiency is specified by the thickness of the holographic layer and the diffraction index modulation. Light of a different wavelength or another angle of incidence is not affected by the hologram. The position of this band of influenceable wavelengths and angles is defined by the wavelength and the angles of incidence of the light beams used for the hologram recording. These recording parameters are represented by the center axis (30° and 450 nm) in FIGS. 2 and 3.

Considered in simpler terms, light that comes from regions outside the field of view does not impinge upon the detector. However, as shown in FIG. 4, this light may take undesired paths (e.g., reflections at the lens edges, multiple reflections between lenses, etc.) through the lens system and thus may reach the sensor after all. These are known as "ghost images".

This stray light is generated by the sun as well, for example, and may therefore reach also very high intensities. In addition, "coffee cup" acoustics, which are conventional, may arise and result in regions in which the light is concentrated.

Although there are conventional measures to remedy such a situation (blackening of the lens edges), they have only a limited effect and a new ghost image analysis has to be carried out with each minor design change of the lens system.

SUMMARY

One object of the present invention is to provide a measure for improving an optical sensor with respect to interference effects.

According to a first aspect, the present invention provides a filter device for an optical sensor, which includes:
- a hologram having a defined number of holographic functions, which are developed in such a way that the filter device blocks optical radiation that impinges upon the filter element from a defined first solid angle and optical radiation that impinges upon the filter device from a defined second solid angle is able to pass through the filter device.

In this way, an anisotropic, holographic stray light filter is provided for an optical sensor, which blocks stray light from defined directions to a defined extent. In an advantageous manner, less stray light reaches a detector of the optical sensor, thereby achieving a better signal to noise ratio and allowing for the realization of greater ranges and/or a higher resolution capacity of the sensor. The filter device is advantageously realizable regardless of a specifically predefined optics design and in a cost-effective manner because it is possible to use holographic foils. The holographic optical design may advantageously be configured for defined fields of view or solid angles of the filter device.

According to a second aspect, the objective is achieved by a method for producing a filter device for an optical sensor, the method having the following steps:

Providing a hologram having a defined number of holographic functions, the holographic functions being developed in such a way that the filter device blocks optical radiation that impinges upon the filter device from a defined first solid angle and optical radiation that impinges upon the filter device from a defined second solid angle is able to pass through the filter device.

Preferred embodiments of the filter device are described herein.

One advantageous further development of the present invention is characterized in that the filter device is developed as a volume hologram. This facilitates a simple realization of a plurality of holographic functions for the filter device.

Another advantageous further development of the device of the present invention is characterized in that the volume hologram has a plurality of layers, and each layer has at least one holographic function. Per hologram, a simplified optical function is thereby ultimately provided, the entire holographic function being achieved by a lamination of the individual layers. Through holographic multiplexing, it is also possible to store multiple optical functions in one layer, and a combination of both is possible as well.

Another advantageous further development of the device according to the present invention is characterized in that the volume hologram has a defined number of a plurality of holographic functions per layer. In this way, multiple holograms are provided in one layer using a conventional multiplexing method, thereby providing a multiplexing hologram.

Another advantageous further development of the device according to the present invention is characterized in that the holographic materials are polymer-based materials. This advantageously realizes excellent environmental characteristics and an insensitivity of the device to heat, which is advantageous in rough motor vehicle environments. In an advantageous manner, demands on the holograms in environments of the motor vehicle characterized by high temperature fluctuations, in particular, e.g., in a range between approximately −40° C. and approximately +120° C., are able to be satisfied in this way.

Below, the present invention is described in detail together with further features and advantages with the aid of a plurality of figures. Identical or functionally equivalent components have been provided with the same reference numerals. The figures are specifically meant to clarify the main principles for the present invention and are not necessarily drawn true to scale. For better clarity, it may be the case that not all reference numerals have been provided in all of the figures.

Disclosed device features similarly result from correspondingly disclosed method features, and vice versa. This particularly means that features, technical advantages and embodiments relating to the device for detecting monochromatic radiation similarly result from corresponding embodiments, features and advantages of the present method for producing a device for detecting monochromatic radiation, and vice versa.

DETAILED DESCRIPTION OF EXAMPLE EMBODIMENTS

One particular main idea of the present invention is to provide an anisotropic stray light filter for an optical sensor for monochromatic radiation.

An anisotropic holographic stray light filter is provided. Optical radiation that impinges upon the stray light filter from outside the field of view is largely deflected or deflected to a defined extent or blocked by the stray light filter and is therefore unable to reach a lens system of the optical sensor, and if it does, then only in an advantageously heavily attenuated form.

Figure 1:
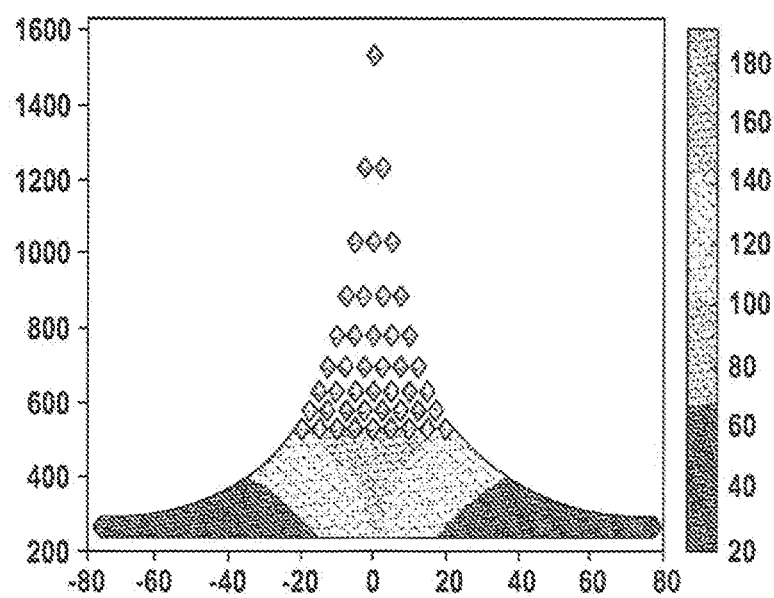
FIG. 1 shows a schematic illustration of a wavelength selectivity of reflection holograms featuring different embodiments of the holographic diffraction grating.
Figure 2:
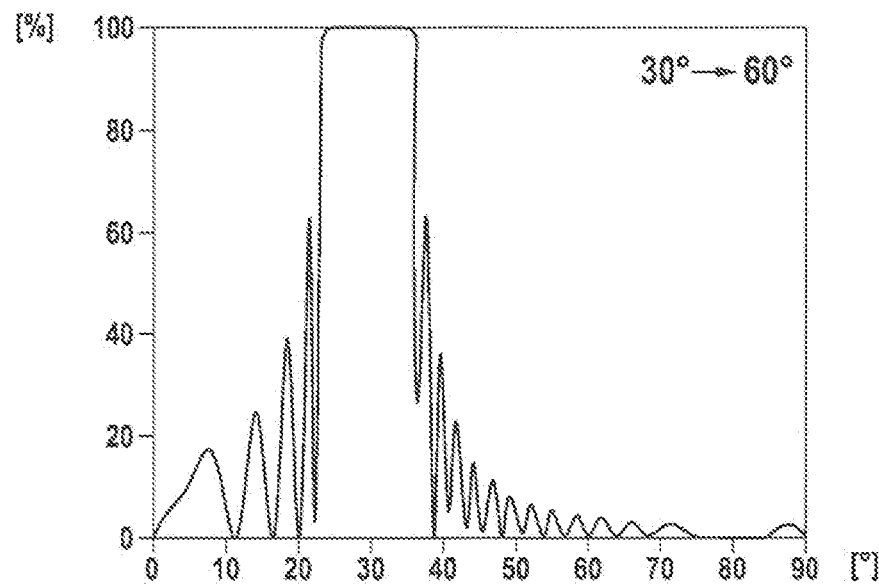
FIGS. 2 and 3 show an illustration of an angle and wavelength selectivity of a holographic optical element in reflection with a defined recording geometry.
Figure 3:
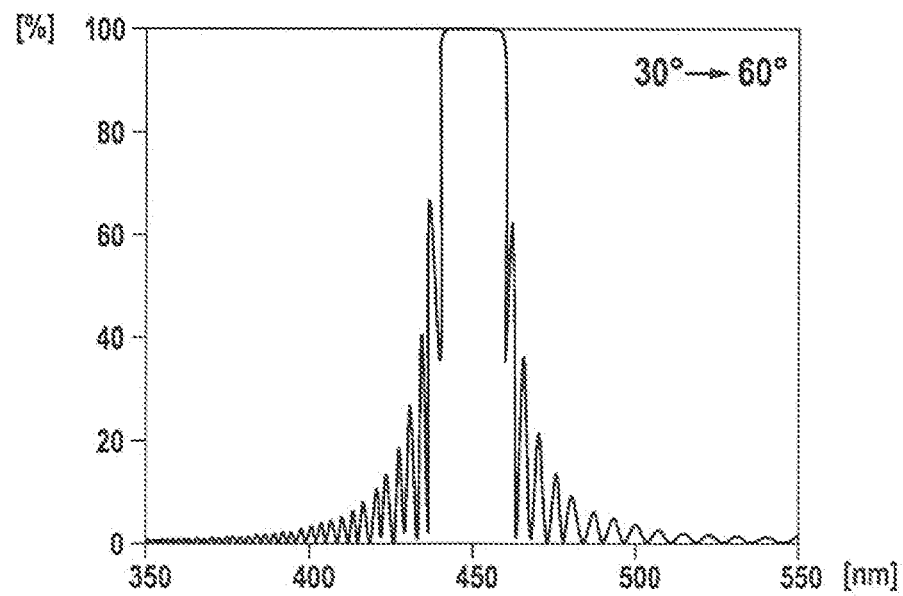
Figure 4:
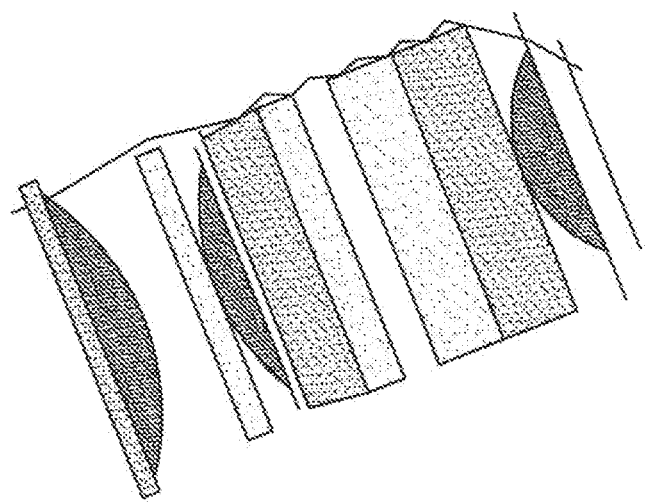
FIG. 4 shows a basic illustration of a ghost image for a 4-lens lidar lens system.
Figure 5:
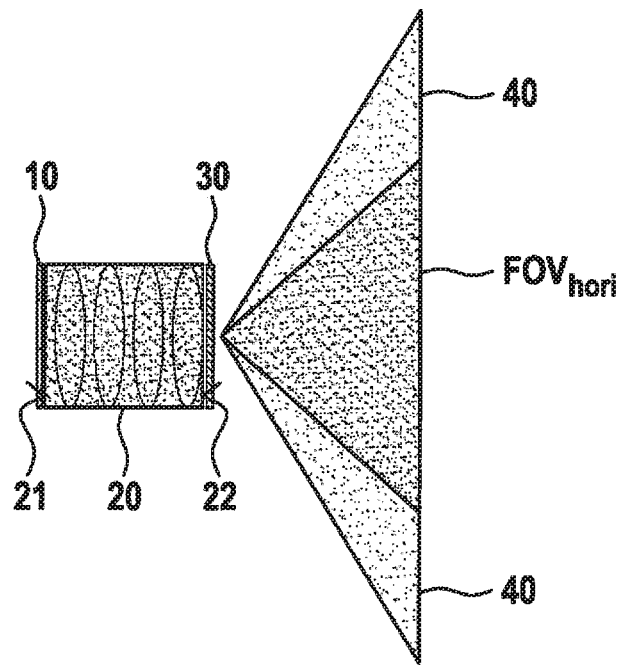
FIG. 5 shows a plan view of a provided filter device.
Figure 6:
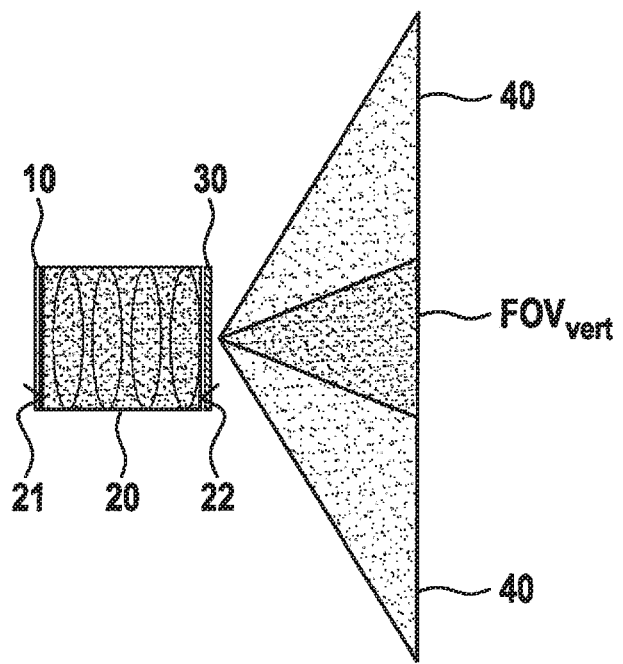
FIG. 6 shows a side view of a provided filter device.

An optical sensor, as schematically illustrated in FIGS. 5 and 6, includes a detection element 10, which is situated on a first surface 21 of a lens system 20. A provided filter device 30 is situated on a second surface 22 of lens system 20, which in essence completely reflects or diffracts optical radiation impinging upon filter device 30 from a solid angle or field of view 40. FIG. 5 shows the system with the optical sensor and filter device 30 in a plan view, and FIG. 6 shows it in a side view.

It can be seen that filter device 30 has an unsymmetrical field of view FOV which has a different development in a plan view (FIG. 5) and in a side view (FIG. 6). Horizontal field of view $FOV_{hori}$ has a defined angular range (e.g., of approximately 500 to approximately 120°), which is thus considerably greater than an angular range (e.g., of approximately 9° to approximately 16°) of a vertical field of view $FOV_{vert}$.

To prevent stray light from outside the utilized field of view FOV from reaching lens system element 20, an anisotropic holographic filter device 30, i.e. one providing different filtering in horizontal field of view $FOV_{hori}$ and in vertical field of view $FOV_{vert}$, is situated on a surface 22 of lens system element 20. This makes it possible that optical radiation impinging from solid angle 40 does not reach lens system 20. The holographic optical function of filter device 30 used for this purpose is developed in such a way that the angle for which the reflection (realized by diffraction) takes place differs horizontally and vertically. Volume holograms, which are able to achieve a very high diffraction efficiency (theoretically up to 100%), are preferably used for filter device 30. Field of view $FOV_{hori}$, $FOV_{vert}$ is not disturbed by the holographic optical function of filter device 30.

Figure 7:
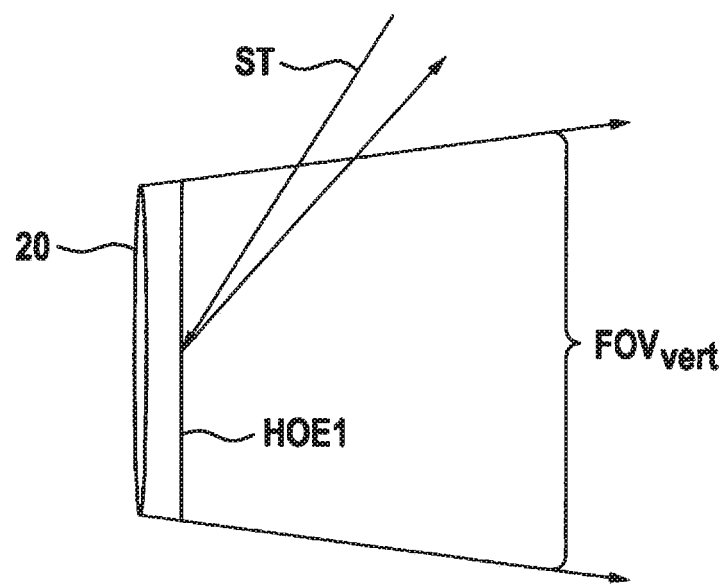
FIGS. 7 and 8 show optical functions of a provided filter device.
Figure 8:
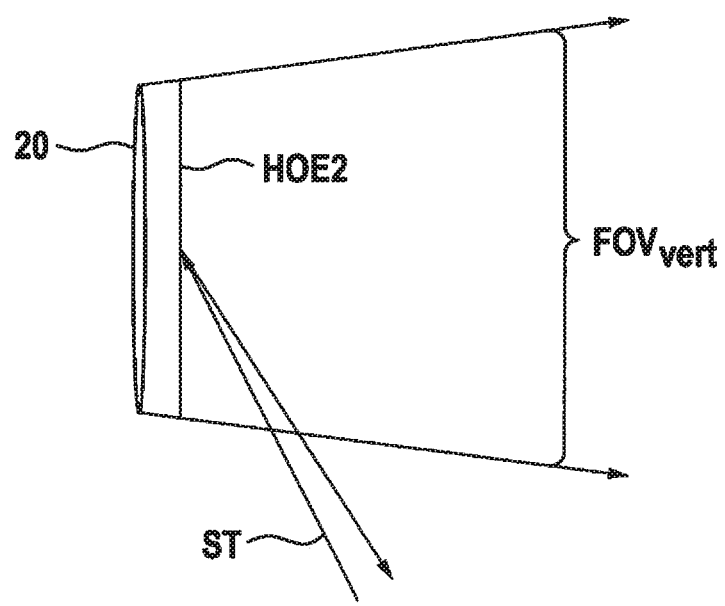

FIGS. 7 and 8 show the optical function or the optical path of anisotropic holographic filter device 30. A deflection of the light outside the vertical field of view $FOV_{vert}$ requires two optical holographic functions HOE1, HOE2 for filter device 30. They are able to be provided either by holographic multiplexing in a single layer or by producing a layer stack having multiple holographic layers. In the illustrated example of FIG. 7, stray radiation ST above vertical field of view $FOV_{vert}$ is guided back in a similar direction by holographic function HOE1 of filter device 30. For the angular range underneath vertical field of view $FOV_{vert}$, this is accomplished by optical holographic function HOE2 of filter device 30.

Figure 9:
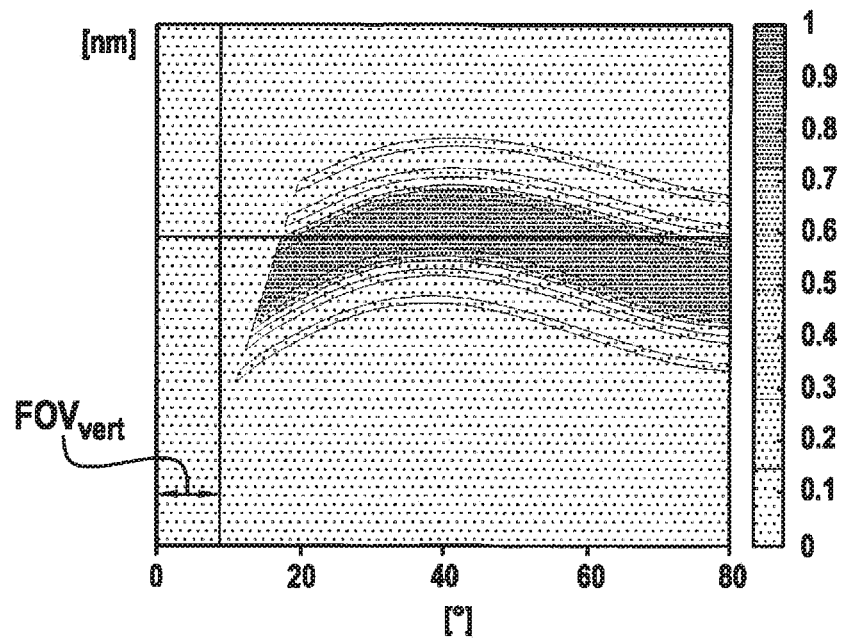
FIGS. 9 and 10 show diffraction characteristics of the provided filter device for a defined useful wavelength, the reconstruction angle θ being varied in a vertical direction.

The calculated diffraction characteristic of anisotropic holographic filter device 30 is shown using the example of holographic function HOE1 of filter device 30 in FIG. 9. At a horizontal reconstruction or reflection angle of 0°, the figure shows a characteristic of the reconstruction wavelength of the stray radiation in nm across an extension of the vertical reconstruction angle in degrees. An efficiency of the reflection or diffraction due to holographic function HOE1 is sketched using a grey schema. The angles in holographic function HOE1 have been defined in such a way that a stray radiation beam having an angle of incidence of 50° with respect to the normal is diffracted at an angle of 40° with respect to the normal (and vice versa). An exemplary recording wavelength of the radiation of 970 nm was defined for the calculation, the angle of incidence with respect to the normal in the vertical direction and the reconstruction wavelength being varied.

In FIG. 9, a range or band may be seen in which holographic function HOE1 diffracts radiation of a defined wavelength with very high efficiency. The position of the band is predefined by the recording wavelength or the wavelength of the electromagnetic useful radiation. The width of the band depends on the material parameters of the holographic layer (e.g., the layer thickness and diffraction index modulation). It can be seen that holographic function HOE1 is inactive within the vertical field of view $FOV_{vert}$ between 0° and approximately 9°.

Figure 11:
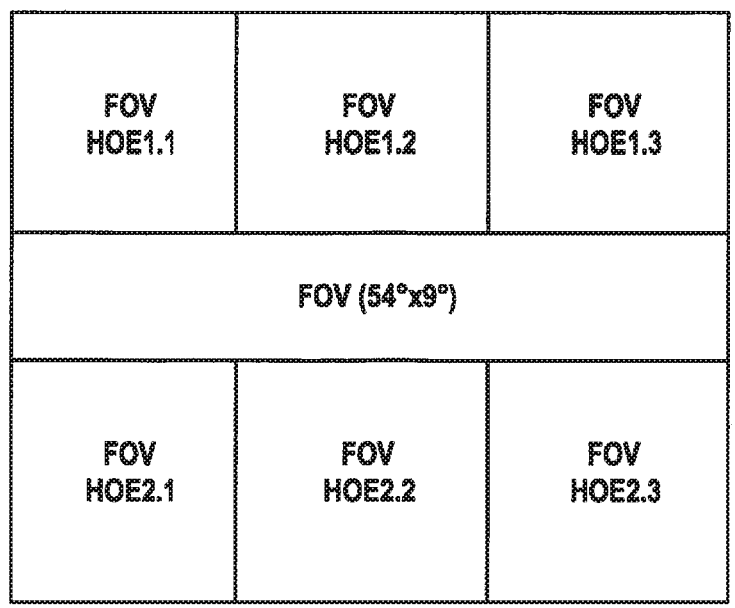
FIG. 11 shows a filter effect for a complete field of view and a segmentation of the horizontal field of view due to the diffraction characteristic illustrated in FIG. 10, with an oblique incident radiation on the filter device.

In order to cover the solid angle of the stray radiation both in the vertical and horizontal directions, field of view FOV of filter device 30 is preferably subdivided into a plurality of segments, which is schematically illustrated in FIG. 11. FIG. 11 shows field of view FOV from the front, and regions 40 outside field of view FOV are processed by a total of six holographic functions HOE1.1, HOE1.2, HOE1.3, HOE2.1, HOE2.2 and HOE2.3 ("sub-holograms").

Each of the mentioned six holographic functions is disposed across the entire surface of filter device 30. It can be seen that the anisotropic filter function of filter device 30 becomes more selective the more holographic functions are developed therein. It has been shown that filter device 30 should have a minimum of four different holographic functions HOE1 . . . HOE4 in order to effectively block optical stray radiation in regions 40 outside field of view FOV.

Figure 12:
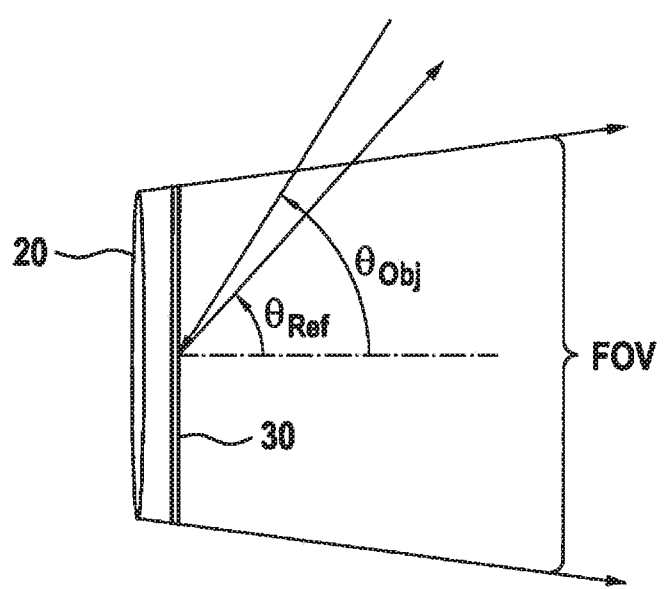
FIGS. 12 and 13 show an angle definition of a hologram recording in a vertical and a horizontal direction.
Figure 13:
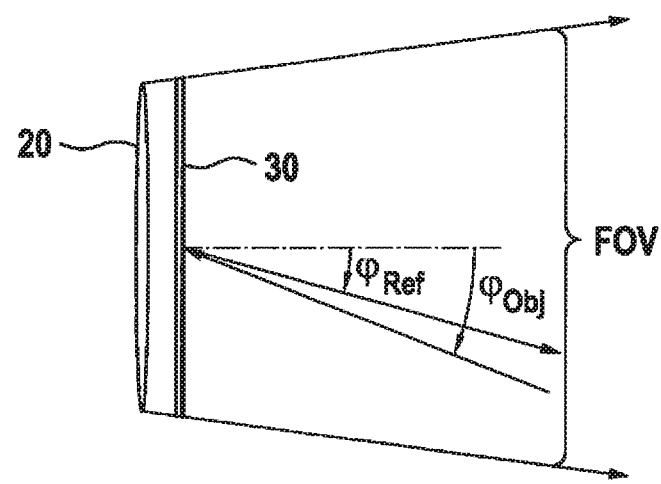

When the holograms are recorded, a reference wave is brought to interference with an object wave. This is schematically illustrated in the side view of FIG. 12 and the plan view of FIG. 13, where it can be seen that the rays are tilted both in the vertical direction relative to the normal $\theta_{Ref}$, $\theta_{Obj}$, and in the horizontal direction relative to the normal $\varphi_{Ref}$, $\varphi_{Obj}$. In an oblique incidence (i.e., $\varphi_{reconstruction} \neq \varphi_{Ref}, \varphi_{Obj}$), the diffraction characteristic of the volume holograms changes.

Figure 10:
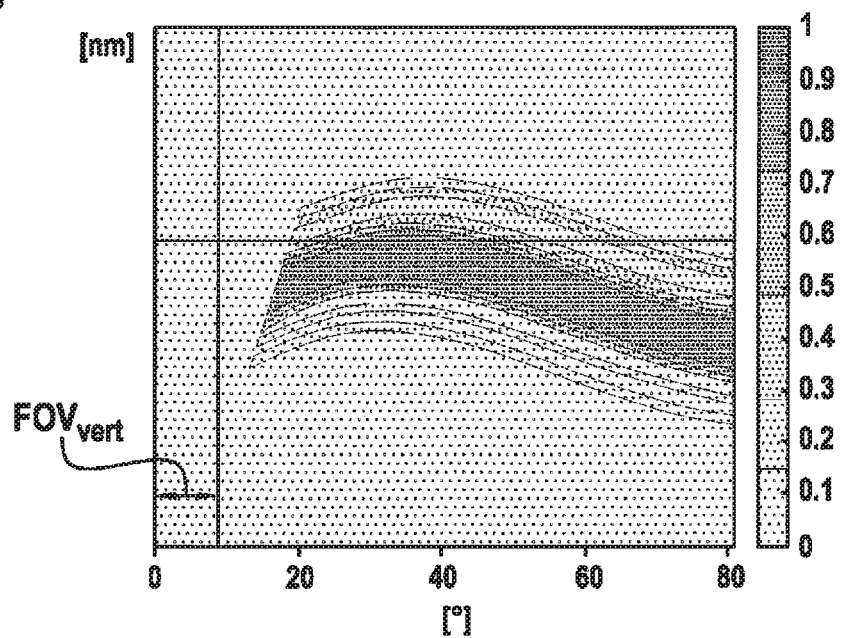

For a reconstruction or reflection angle $\varphi_{reconstruction} = \varphi_{Ref} + 30°$, the diffraction characteristic illustrated in FIG. 10 results for vertical field of view $FOV_{vert}$. It can be seen that in comparison with the diffraction characteristic shown in FIG. 9, the band shifts to smaller wavelengths at $\varphi_{reconstruction} = \varphi_{Ref}$. If the demands on the system are high (e.g., with regard to the temperature range, accuracy, etc.), then the number of sub-holograms of filter device 30 increases. These sub-holograms may either be written in a holographic volume by holographic multiplexing or else by forming a stack of multiple holographic layers that are laminated on top of one another.

Holographic polymer materials or polymer-based materials are preferably used for filter device 30; these have advantageous properties when used in the motor vehicle field because they are very robust with respect to the environmental influences prevailing there (e.g., temperature, humidity fluctuations, etc.).

With the aid of multiplexing, a plurality of optical functions is able to be written in a layer of a holographic material. How many holograms are able to be written in a holographic material depends on the material, but the efficiency of the individual holograms decreases with the number of stored optical functions. For this reason, it may also be provided to store the optical functions in a plurality of holographic layers that are laminated on top of one another. By realizing this stack, higher efficiency is able to be achieved in a single layer in comparison with the multiplex hologram.

In an advantageous manner, the optical sensor provided with the proposed filter device for detecting monochromatic radiation may be developed as a lidar sensor or as a time of flight sensor.

It is of course understood that all previously mentioned numerical values (e.g., in connection with angles, field of view, etc.) are merely of an exemplary nature.

One skilled in the art will understand that a multitude of modifications of the present invention is possible without departing from the core of the invention.

What is claimed is:

1. A filter device for an optical sensor, comprising:
an anisotropic stray light filter for the optical sensor for monochromatic radiation, wherein to prevent stray light from outside a utilized field of view from reaching a lens system element of the optical sensor, the anisotropic holographic filter provides different filtering in a horizontal field of view and in a vertical field of view, and is situated on a surface of the lens system element, so that optical radiation impinging from a particular solid angle does not reach the lens system element, including:
a hologram having a defined number of holographic optical functions, which provide that the filter device blocks optical radiation that impinges upon the filter device from a defined first solid angle, and further provides that optical radiation that impinges upon the filter device from a defined second solid angle is passable through the filter device;
wherein the holographic optical functions of the filter device is configured so that an angle for which a reflection, realized by diffraction, takes place differs horizontally and vertically,
wherein the fields of view are not disturbed by the holographic optical functions of the filter device, and
wherein the optical holographic functions are provided either by holographic multiplexing in a single layer or by producing a layer stack having multiple holographic layers.

2. The filter device as recited in claim 1, wherein the filter device includes a volume hologram.

3. The filter device as recited in claim 2, wherein the volume hologram has a plurality of layers, and each layer has at least one holographic function.

4. The filter device as recited in claim 3, wherein the volume hologram has a defined number of a plurality of holographic functions per layer of the layers.

5. The filter device as recited in claim 1, wherein holographic materials of the filter device includes polymer-based materials.

6. The filter device as recited in claim 1, wherein the optical sensor includes a lidar sensor or a time of flight sensor.

7. A method for producing a filter device for an optical sensor, the method comprising:
providing a hologram having a defined number of holographic functions, wherein the hologram includes a hologram anisotropic stray light filter for the optical sensor for monochromatic radiation, wherein to prevent stray light from outside a utilized field of view from reaching a lens system element of the optical sensor, the anisotropic holographic filter provides different filtering in a horizontal field of view and in a vertical field of view, and is situated on a surface of the lens system element, so that optical radiation impinging from a particular solid angle does not reach the lens system element;
wherein the holographic functions provide that the filter device blocks radiation that impinges upon the filter device from a defined first solid angle, and further provides that radiation that impinges upon the filter device from a defined second solid angle is passable through the filter device;
wherein the holographic optical functions of the filter device are configured so that an angle for which a reflection, realized by diffraction, takes place differs horizontally and vertically,
wherein the fields of view are not disturbed by the holographic optical functions of the filter device, and
wherein the optical holographic functions are provided either by holographic multiplexing in a single layer or by producing a layer stack having multiple holographic layers.

8. The method as recited in claim 7, wherein the filter device includes a volume hologram.

9. The method as recited in claim 7, wherein the volume hologram has a plurality of layers, and each layer has at least one holographic function.

10. The method as recited in claim 9, wherein the volume hologram has a defined number of a plurality of holographic functions per layer of the layers.

11. The method as recited in claim 7, wherein holographic materials of the filter device includes polymer-based materials.

12. The method as recited in claim 7, wherein the optical sensor includes a lidar sensor or a time of flight sensor.

* * * * *